US006080964A

United States Patent [19]

Gmeiner

[11] Patent Number: 6,080,964

[45] Date of Patent: Jun. 27, 2000

[54] PROCESS FOR PREDRYING A COIL BLOCK CONTAINING AT LEAST ONE WINDING AND SOLID INSULATION

[75] Inventor: Paul Gmeiner, Lieli, Switzerland

[73] Assignee: Micafil Vakuumtechnik AG, Zurich, Switzerland

[21] Appl. No.: 09/061,046

[22] Filed: Apr. 16, 1998

[51] Int. Cl.[7] ................................ A21B 1/00; H01F 7/06

[52] U.S. Cl. ............................................ 219/400; 29/606

[58] Field of Search .................................... 219/400, 359; 99/467; 126/274; 338/188; 29/165, 606

[56] References Cited

U.S. PATENT DOCUMENTS

| | | | |
|---|---|---|---|
| 3,233,311 | 2/1966 | Giegerich et al. | 29/155.57 |
| 3,764,718 | 10/1973 | Middough et al. | 13/31 |
| 3,769,008 | 10/1973 | Borok et al. | 75/225 |
| 4,249,068 | 2/1981 | Mangan et al. | 219/497 |
| 4,403,267 | 9/1983 | Verhoff et al. | 361/42 |
| 4,499,369 | 2/1985 | Gibb | 219/552 |
| 4,615,778 | 10/1986 | Elton | 204/181.1 |
| 4,970,372 | 11/1990 | Fleiter et al. | 219/400 |
| 5,069,731 | 12/1991 | Yoshizawa et al. | 148/305 |
| 5,388,809 | 2/1995 | Hemsath | 266/80 |
| 5,524,020 | 6/1996 | Jhawar et al. | 373/110 |
| 5,621,372 | 4/1997 | Purohit | 336/60 |

FOREIGN PATENT DOCUMENTS

| | | |
|---|---|---|
| 543181 A1 | 5/1993 | European Pat. Off. . |
| 3927964 | 1/1992 | Germany . |
| 2235422 | 5/1998 | Germany . |
| 5-6833 | 1/1917 | Japan . |
| 55-178223 | 12/1980 | Japan . |
| WO91/07764 | 5/1991 | WIPO . |

OTHER PUBLICATIONS

Berkhahn, Von Klaus: Die Kerosindampf—Trocknung von Transformatoren, BBC–Nachrichten, 1975, H. 8/9, pp.458–463.

Kusay, R.G.P.: Vacuum Drying of Power Transformers Can Reduce Outages, Electrical Review, Apr. 23, 1971, pp. 551–556.

*Primary Examiner*—Teresa Walberg
*Assistant Examiner*—Daniel Robinson
*Attorney, Agent, or Firm*—Burns, Doane, Swecker & Mathis, L.L.P.

[57] ABSTRACT

The process is used for predrying a coil block (5) inside a gas-tight housing (1), said coil block containing at least one winding (51) and solid insulations. The winding is hereby heated under reduced pressure with direct current or low-frequency alternating current to an upper winding temperature. Parallel to this, the solid insulations are heated with air circulating inside the housing (1). The air temperature is hereby maintained lower than the winding temperature. The combined heating with heating current and circulating air results in an especially uniform predrying, and at the same time saves time and energy. At the same time, the winding can be stabilized and dimensioned during the predrying process under the action of pressure.

8 Claims, 4 Drawing Sheets

PROCESS FOR PREDRYING A COIL BLOCK CONTAINING AT LEAST ONE WINDING AND SOLID INSULATION

FIELD OF TECHNOLOGY

The invention is based on a process for predrying a coil block containing at least one winding, in which the at least one winding is heated with an electric current under reduced pressure in a gas-tight housing. Such a process is usually used for stabilizing the coil block prior to installation. into an electric machine or electric apparatus, e.g., a transformer. When simultaneously using pressure, the process can also be used to adapt the geometric dimensions of the coil block to parts of the machine or device which carry the coil block, and which support it so that it will be able to absorb short-circuit forces.

STATE OF THE ART

A process of the above mentioned type is described in JP 5006833 A. In this process, a winding of a coil block is heated with a direct current under a vacuum in a drying oven. Moisture discharged from the heated coil block is removed from the inside of the drying oven by means of a vacuum device. A temperature regulator based on a thermo-element keeps the temperature of the coil block within the range that is optimal for a quick and effective predrying of the coil block.

SUMMARY OF THE INVENTION

The invention, relates to a method for predrying a coil block containing at least one winding and solid insulations, where this method enables an especially gentle removal of moisture, but can be performed especially quickly and with energy savings.

The method according to the invention is characterized in that the parts of the solid insulations-especially the barrier insulation-which are not in direct contact with the currentheated winding are now heated not only by heat conduction but also by convection and heat radiation. For this reason, the coil block is particularly uniformly heated, and the moisture present in the solid insulations is removed in an extremely gentle manner.

By circulating air in the gas-tight housing enclosing the winding, the discharged moisture is quickly removed from the solid insulations of the coil block.

Since a large part of the energy is conducted from the inside to the solid insulations of the coil block, the part of the solid insulations in direct contact with the power conductor of the winding is heated particularly quickly. This part of the solid insulations is then able to quickly transfer part of its heat to the parts of the solid insulations not in direct contact with the current conductor of the winding—such as the barrier insulations. The thermal energy—e.g. that which was generated in an autoclave—that brings these parts to the desired predrying temperature is therefore relatively small. Through a combination of electrical heating and thermal heating with circulating air, energy and time is saved when the predrying method is being performed.

If the air pressure in the gas-tight housing is temporarily reduced during heating, paper present in the solid insulations does not significantly depolymerize.

At the same time, the air circulating in the gas-tight housing is heated only to a lower temperature than the temperature of the coil block. The devices accommodated inside the housing, in particular the hydraulic compression devices intended for exerting pressure on the coil blocks, therefore require little maintenance.

BRIEF DESCRIPTION OF DRAWINGS

The drawings show a simplified view of an exemplary embodiment of the drawing, i.e..

DETAILED DESCRIPTION OF EXEMPLARY EMBODIMENTS

Figure 1:
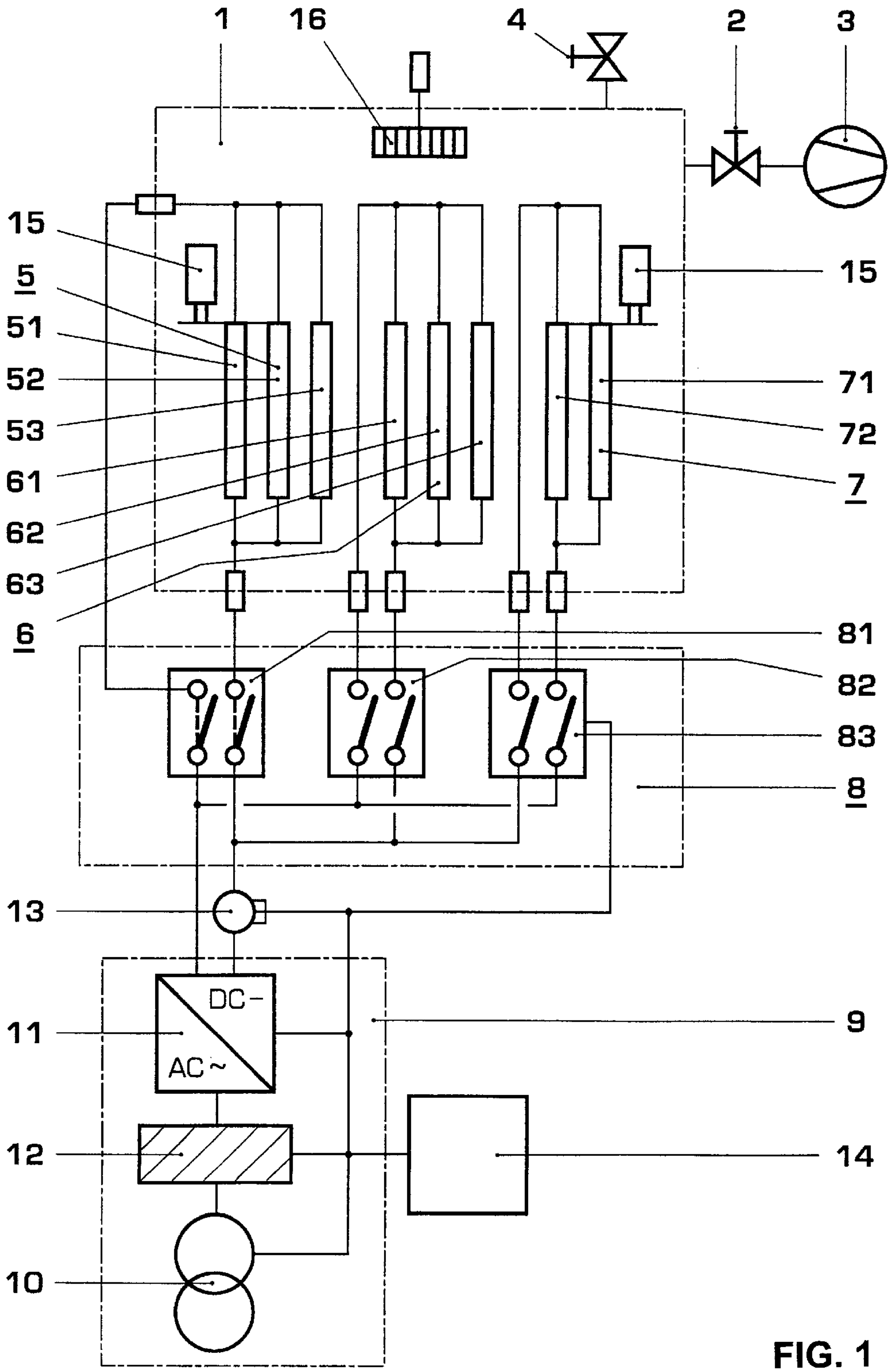
FIG. 1 shows a block switching diagram of a first device for performing the process according to the invention with an autoclave holding three coil blocks, a direct current source, and a switching device located between the windings of the coil blocks and the direct current source.
Figure 2:
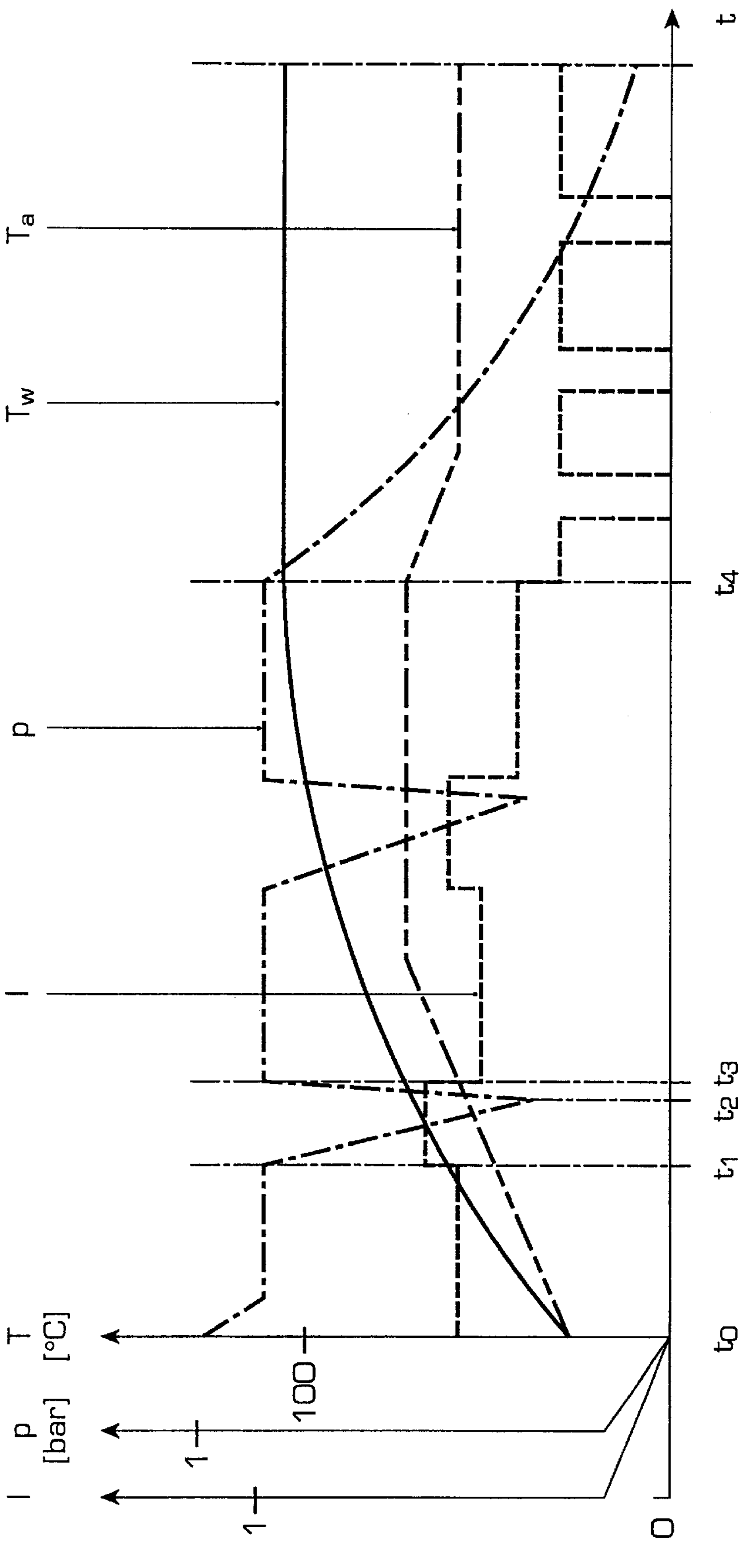
FIG. 2 shows a diagram with important parameters of the process according to the invention, such as intensity of the direct current I supplied by the direct current source (given in relative units), the pressure p [bar] present in the autoclave, and the temperature [° C.] at the windings (curve $T_w$) and in the autoclave curve ($T_a$) as a function of time t.

In all figures, identical reference numbers refer to parts with the same function. In the device for performing the process according to the invention as shown in FIG. 1, the number 1 refers to a vacuum-tight autoclave connected via a straight-way valve 2 to a vacuum pump 3, said autoclave being connectable via a ventilation valve 4 with circulating air. The autoclave holds three windings 51, 52, 53 or 61, 62, 63 or 71, 72 respectively, and coil blocks 5 or 6 or 7 provided with solid insulations (not shown). The windings, e.g. 51, 52, 53, of each coil block, e.g., 5, can be constructed in the same manner and are switched parallel to each other. Two power connections to the windings of each coil block are guided through feed-throughs (not referenced) from the inside of the autoclave 1 to a switching device 8 which itself is in effective connection with the output of a direct current source 9.

The direct current source 9 is equipped with a transformer 10 and a rectifier 11 acting on the switch 8, as well as a step switch 12 located between the transformer 10 and the rectifier 11. A current and voltage converter 13 is located in a connecting line between the output of the rectifier 11 and an input of the switching device 8. The output signals of the current and voltage converter 13 act on a control device 14. This control device is in effective connection with the transformer 10, the step switch 12, the rectifier 11, and the switching device 8. In addition, a compression device 15, preferably one acting hydraulically, as well as a convection air fan 16 are located in the autoclave 1.

This device now acts as follows: The coil blocks 5, 6, 7 in the autoclave 1, which are supposed to be predried, are heated from a time $t_0$ with direct current of an intensity given by the dimensions of the coil blocks or windings 51, 52, 53, 61, 62, 63, 71, and 72. Direct current is especially suitable, since the heating voltage then can be selected relatively low, and since, in contrast to an alternating current, there is no idle current compensation. The power intensity is set in an especially simple manner via the step switch 12 actuated by the control device 14. If all windings are constructed identically, this is achieved in that three switching points 81, 82, and 83 provided in the switching device 8 are closed. If the windings 51, 52, 53 or 61, 62, 63 or 71, 72 respectively are constructed identically within each of the coil blocks 5 or 6 or 7 respectively, and if each of them is associated approximate,y to one phase of a rotary current, but are constructed differently in each of the coil blocks, then the windings of the individual coil blocks are heated in a time-staggered manner. This is achieved in that first the two switching points 82 and 83 are opened, and the switching point 81 is closed. After a heating period predetermined by a monitoring of the winding temperature, the switching point 81 is opened, and-after switching point 82 is closed, the coil block 6 is heated by direct current. In a corresponding manner, coil block 7 and then, in a cyclical manner, again all coil blocks are again heated consecutively.

If the windings within a coil block are not identical, e.g., if they are constructed as the upper and lower voltage winding of a transformer, then one of the switching points, e.g. 81, is connected with the upper voltage winding, and one of the other switching points, e.g. 82, can be connected to the lower voltage winding. The windings provided within a single coil block then can be heated in a time-staggered manner.

The winding temperature can be determined indirectly via the direct current and voltage values that are output by the current and voltage converter, or can be determined from a measurement of the electrical resistance of the windings. Alternatively, or additionally, it is also possible to determine this temperature through sensors that are passed through the autoclave housing to the respective windings.

Parallel to heating the windings with direct current, the air present in the autoclave 1 is heated under a reduced pressure. For this purpose, the ventilation valve 4 is closed, and the air pressure in the autoclave is reduced to several hundred mbar, e.g. 500 mbar, by pumping out air through the opened straightway valve 2 and the vacuum pump 3. By reducing the air pressure, the evaporation of moisture from the solid insulations of the coil blocks is facilitated. However, the air pressure should be smaller than atmospheric pressure to obtain a sufficient evaporation rate, preferably between 950 and 500 mbar.

At the same time, the autoclave 1 and thus the air present in the autoclave are heated. The combined heating with direct current and air causes the heat required for predrying the solid insulations of the coil blocks to be supplied at the same time both from inside and outside. This results in an especially quick and gentle drying. Water bound in the solid insulations is fed away from the heated windings outwards to the surfaces of the solid insulations, and is absorbed by the air as water vapor. By circulating the air with the help of the convection air fan, parts of the solid insulations, such as, e.g., barrier insulations located between two windings, which are not in direct contact with a winding of the coil block, are heated especially quickly and uniformly, and the water exiting the solid insulations is removed quickly from the coil blocks. Here it is especially recommended that the circulating air stream is guided in such a manner that it flows between the individual coil blocks 5, 6, 7 from the bottom to the top. By reducing the air pressure, the discharge of the water from the solid insulations is promoted.

At the time $t_1$, the pressure in the autoclave 1 is reduced during heating by the vacuum pump 3 to less than 500 mbar, but, for reasons of economy, to maximally 0.1 mbar. At the same time, the current intensity of the direct current is also increased. The reason for this is mostly that, because of the reduced pressure, more water is evaporated from the solids insulations inside the autoclave 1.

At the time $t_2$, when the air pressure in the autoclave 1 has been reduced to several mbar, and a large part of the moisture absorbed by the air has been pumped off, the straightway valve 2 is closed, and the air pressure in the autoclave 1 is again increased to the constant value of, e.g., 500 mbar by a controlled opening of the ventilation valve 4. As soon as the air pressure has reached this value, a first heating cycle is completed at a time $t_3$.

At the time $t_3$, a new heating cycle begins. At first, the direct current intensity is reduced. It is set in such a way that it is smaller than in the previous cycle. The reason for this is that, on the one hand, there is not as much water to be removed from the solid insulations as when the heating began, and, on the other hand, the autoclave 1 has already been heated almost to its target, temperature of, e.g. 70 or 80° C. During the second cycle, the windings are heated by the direct current and, accordingly, the solid insulations are further heated by heat which is given off by the windings and the circulating air. In this cycle, the autoclave 1 reaches its final temperature. The heating of the autoclave is now reduced so that its temperature $T_a$ remains constant at its final temperature.

After one or more additional cycles, an upper winding temperature is reached at a time $t_4$. The air pressure in the autoclave is now continuously reduced. Intensity and duration of the direct current are set in such a way that the upper winding temperature is kept constant. This is accomplished in that during the holding of the windings at the upper winding temperature, the direct current is interrupted when the temperature $T_w$ of the windings exceeds the upper winding temperature by a predetermined limit. If the winding temperature $T_w$ falls below a predetermined lower threshold value while the current is being interrupted, then the direct current is again turned on. At the time $t_4$, the residual moisture is removed from the solid insulations practically under a vacuum with a small addition of energy.

During the entire heating phase and during the holding of the windings at the upper winding temperature, a uniformly acting compression pressure is applied to the coil blocks. This compression pressure is generated by the compression device 15, and can, according to the air pressure in the autoclave, have a pulsing effect. The compression pressure causes the coil blocks to be stabilized and adapted to the given dimensions.

After heating and subsequent stabilization, the coil blocks are sufficiently predried and, after the cooling and opening of the autoclave, can be installed in the intended electrical devices or machines.

Figure 3:
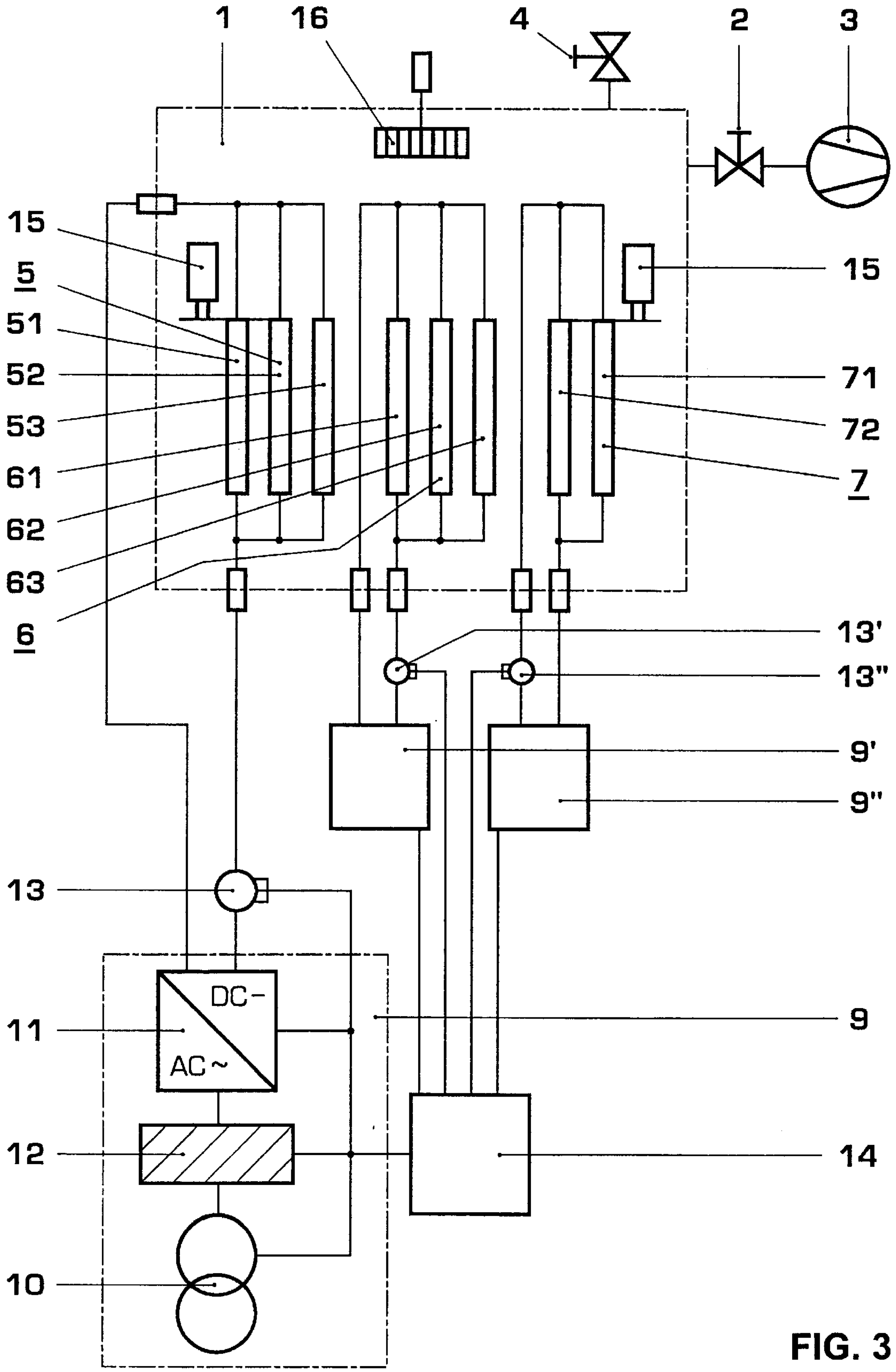
FIG. 3 shows a block switching diagram of a second device for performing the process according to the invention, with an autoclave accommodating three coil blocks and with three direct current sources, each of which heats one of three coil blocks.

In the device for performing the process according to the invention shown in figure 3, there is no switching device 8, and each of the three coil blocks 5, 6, 7 is heated by one of the direct current sources 9, 9', 9". These direct current sources each contain a rectifier, a transformer, and a step switch that is located between the transformer and the rectifier. The measuring data required for temperature determination are supplied by three current and voltage converters 13, 13', 13" which are located in the power supply to each of three coil blocks 5, 6, 7. With this embodiment of the device according to the invention, three differently constructed coil blocks can be simultaneously heated with direct current and kept at a specific temperature.

The direct current sources 9, 9', and 9" shown in FIGS. 1 and 3 do not necessarily have to contain a transformer with a subsequent step switch. They can also contain a controllable transformer whose controllable output voltage is fed directly to the input of the rectifier.

Figure 4:
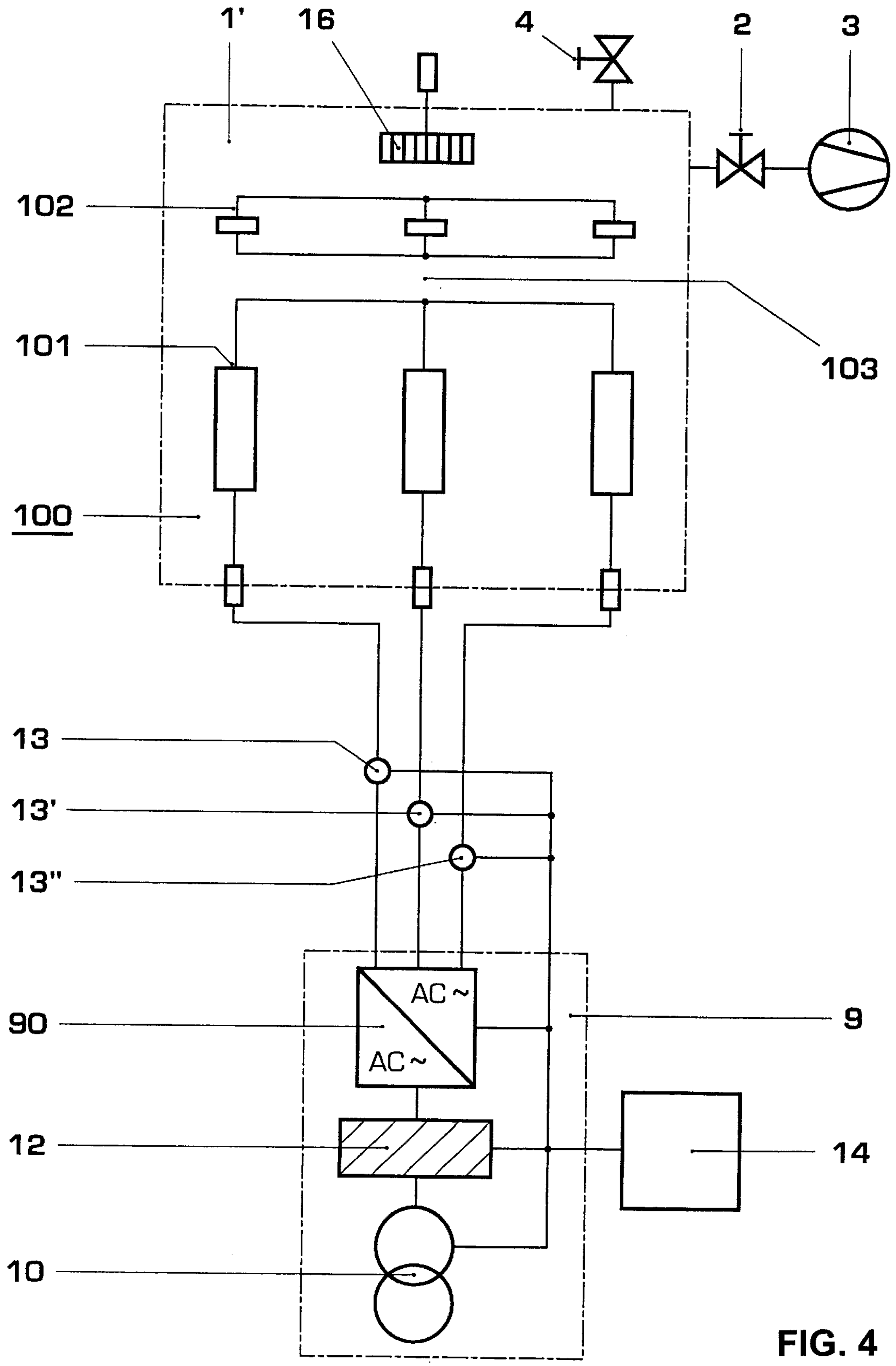
FIG. 4 shows a block switching diagram of a third device for performing the process according to the invention, with a transformer and an alternating current to alternating current converter heating the transformer windings with low-frequency alternating current.

In the device for performing the process according to the invention shown in FIG. 4, the heating current is a three-phased, low-frequency alternating current with frequencies from about 0.1 to. about 20 Hz. This current is supplied by an AC/AC converter 90 and is supplied via feedthroughs (not shown) through the wall of a housing 1' of a transformer 100 that is constructed in accordance with the autoclave 1 in a gas-tight manner to its primary windings 101 which have been switched, e.g., in the shape of a star. The secondary windings 102 of the transformer 100 are short-circuited. The windings 101 and 102 are part of a coil block 103, which contains solid insulations and a magnetic core. In addition, the heating is accomplished in accordance with the two previously described devices with circulating air. Heated air is advantageously supplied via the ventilation valve 4 and is distributed through the convection air fan 16 inside the entire housing 1'. The combination of the low-frequency alternating current heating and the thermally heated air results in an especially efficient predrying of the coil block of the transformer 100 that contains solid insulations, the magnetic core, and the windings 101 and 102.

LIST OF REFERENCE NUMBERS

1 Autoclave
2 Straightway valve
3 Vacuum pump
4 Ventilation valve
5,6,7 Coil blocks
8 Switching device
9,9', 9" Direct current sources
10 Transformer
11 Rectifier
12 Step switch
13 13', 13" Current and voltage converter
14 Control device
15 Compression device
16 Convection air fan
51, 52, 53,
61, 62, 63,
71, 72 Windings
81, 82, 83 Switching points
90 AC/AC converter
100 Transformer
101, 102 Windings
103 Coil block

I claim:

1. A process for predrying a coil block containing at least one winding and solid insulations, the process comprising the steps of:

heating the at least one winding under reduced pressure in a gas-tight housing with current (I) to an upper winding temperature;

circulating air in the housing, said air being heated to a temperature less than the winding temperature ($T_w$), said air heating the solid insulations at the same time as said current heating.

2. A process according to claim 1, wherein during heating the air pressure (p) in the housing is cyclically reduced and increased.

3. A process according to claim 2, wherein the air pressure (p) is kept during part of a pressure cycle on an approximately constant value of 500 to 950 mbar, is then lowered to a value of 0.1 to 500 mbar, and is then increased to the approximately constant value.

4. A process according to claim 3, wherein during the reduction and increase of the air pressure (p) the intensity of the heating, current (I) is increased.

5. A process according to claim 4, wherein the current intensity of the heating current (I) is reduced in consecutive pressure cycles.

6. A process according to claim 1, wherein after heating of the winding to the upper winding temperature, the air pressure is continuously reduced, and the intensity and duration of the heating current is set in such a way that the upper winding temperature is kept constant.

7. A process according to claim 6, wherein while holding the at least one winding at the upper winding temperature the heating current is interrupted when the temperature ($T_w$) of the at least one winding exceeds the upper winding temperature by a predetermined limit.

8. A process according to claim 6, wherein a uniformly acting compression pressure is applied to the at least one winding during heating and during the holding at the upper winding temperature.

* * * * *